Aug. 7, 1928.  
A. W. BROWN  
1,679,402  
BOTTLE MIXING, INSPECTING, AND CRATING APPARATUS  
Filed May 6, 1927  
4 Sheets-Sheet 1
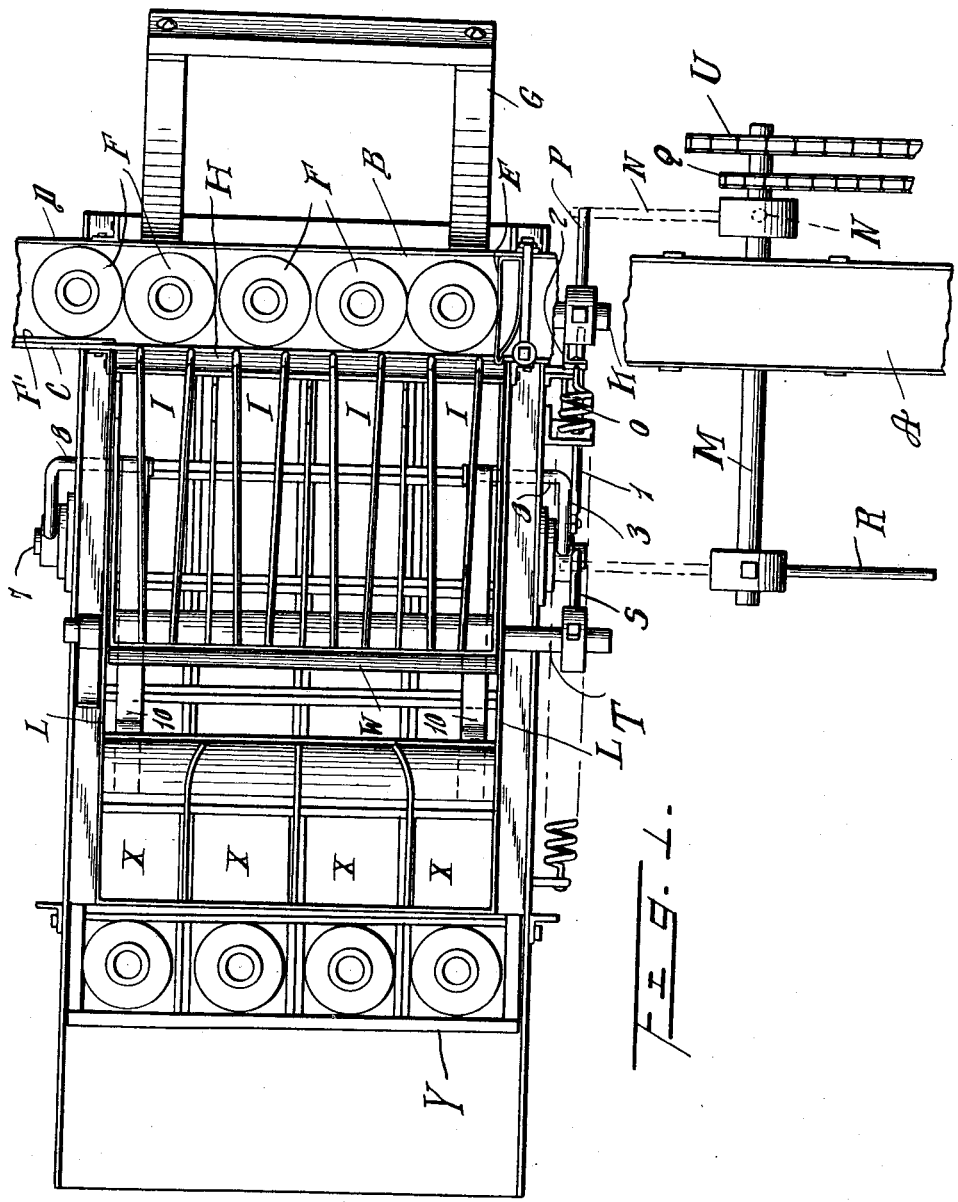
Inventor  
A. W. Brown,  
By Bacon & Thomas  
Attorney

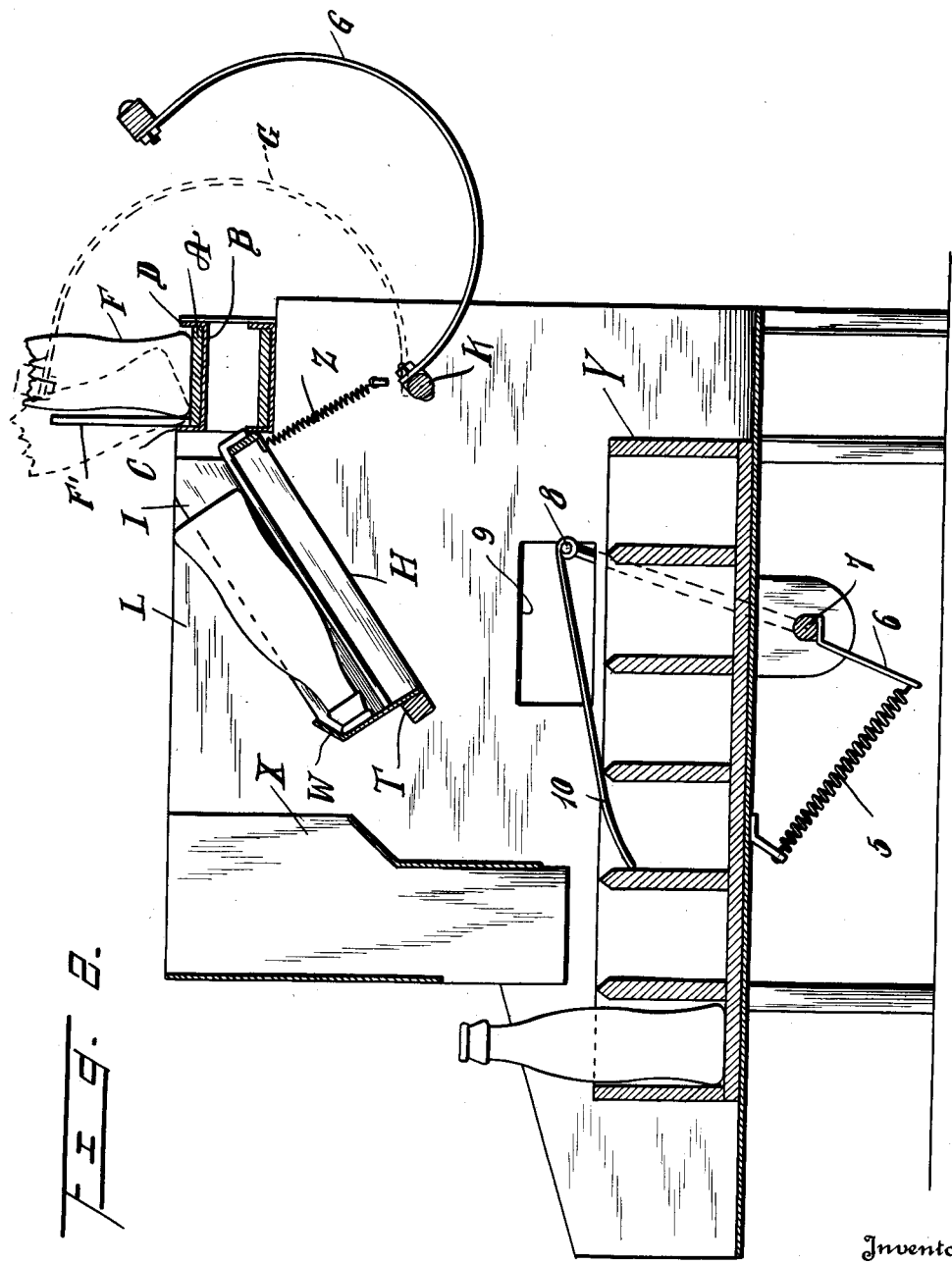

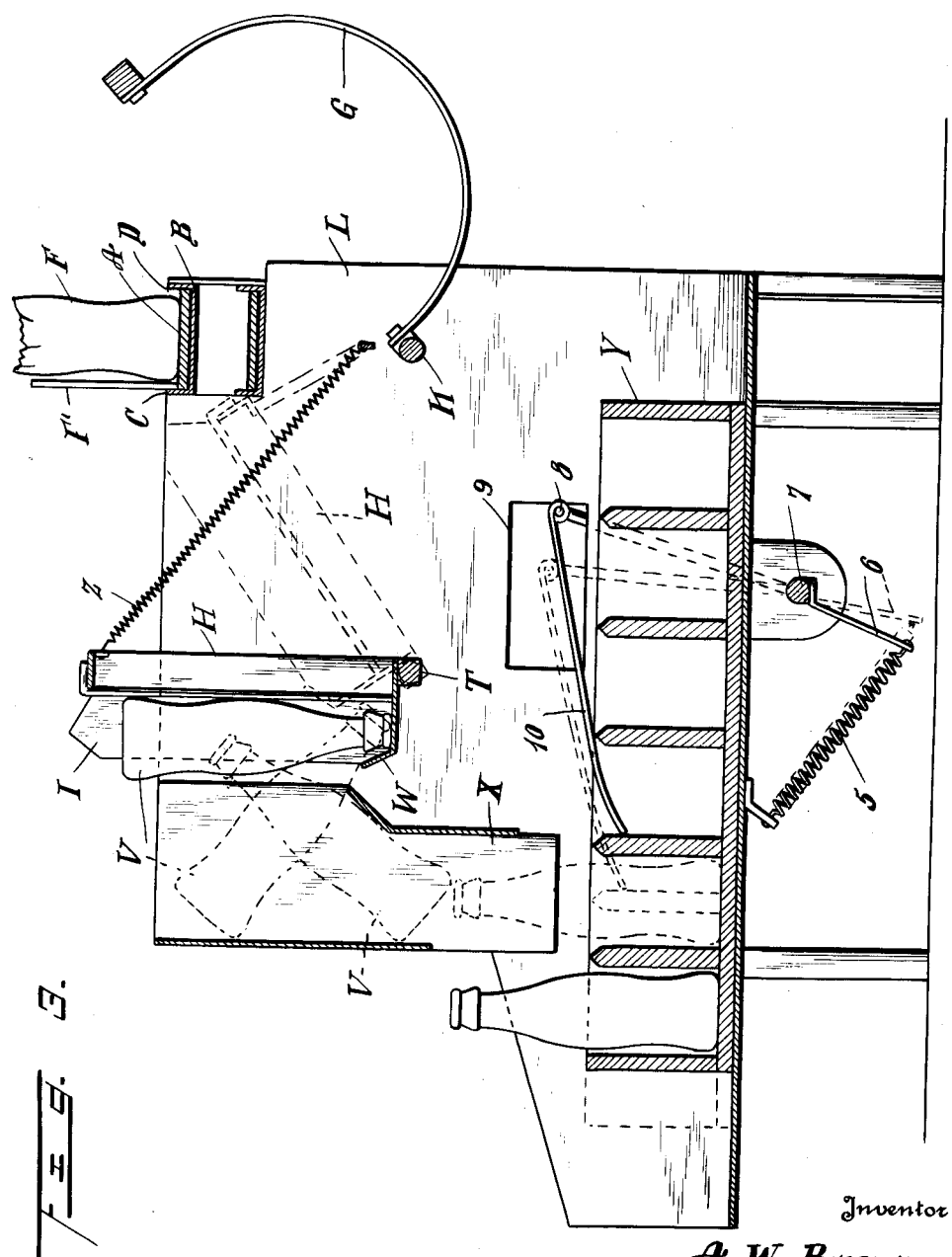

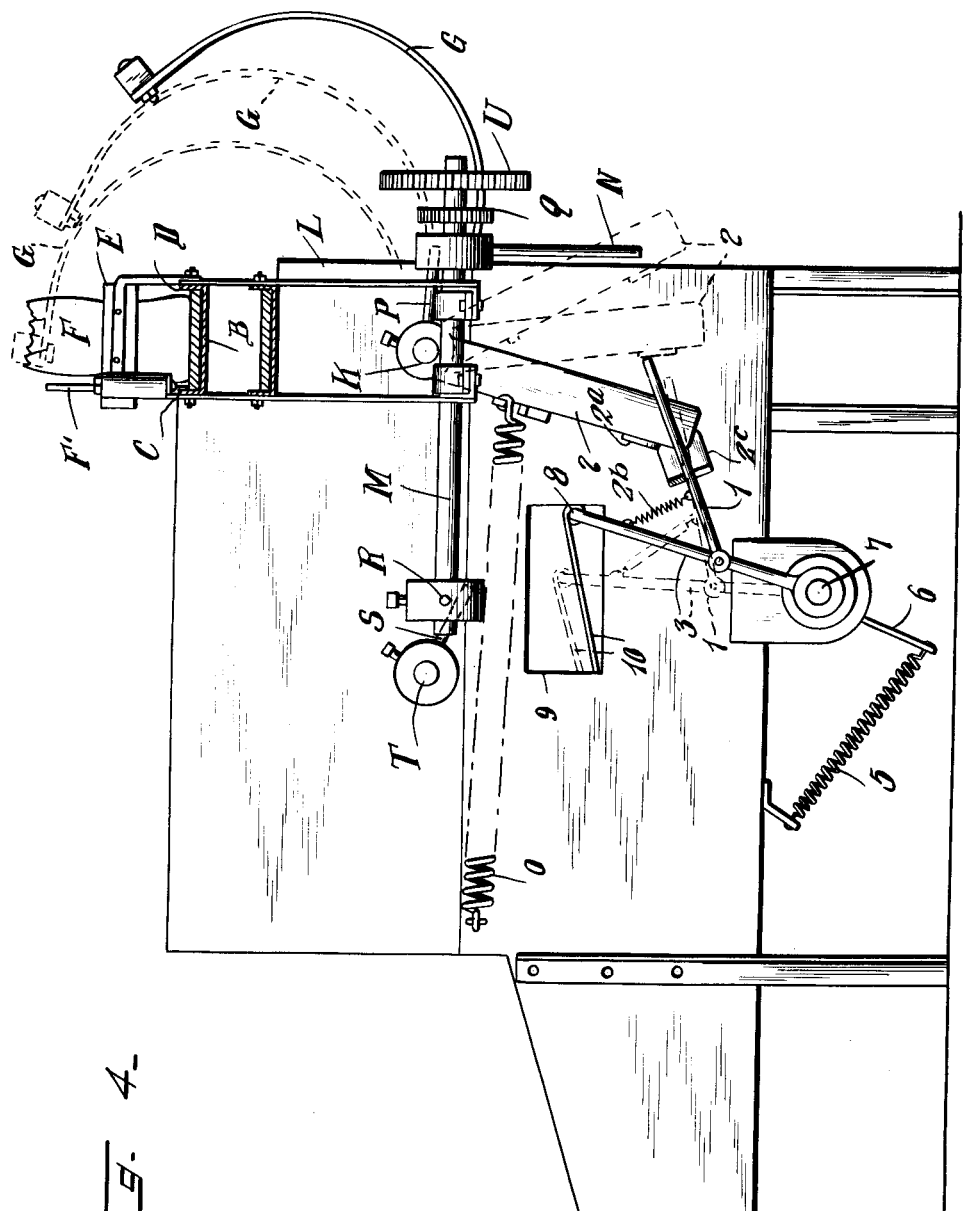

Patented Aug. 7, 1928.

1,679,402

UNITED STATES PATENT OFFICE.

ANTHONY W. BROWN, OF GAINESVILLE, FLORIDA.

BOTTLE MIXING, INSPECTING, AND CRATING APPARATUS.

Application filed May 6, 1927. Serial No. 189,277.

This invention relates to a mechanism adapted to be attached to the conventional bottling machinery for crating bottles.

The primary object of the invention is to provide an attachment for removing bottles from the conveyor associated with the bottling mechanism and placing them in a position for inspection, mixing the contents of the bottles, and thence transferring the bottles to cases or crates.

Another object of the invention relates to the means for inverting the bottles in order that an inspection of the condition of the material within the bottles and the condition of the bottles themselves may be readily determined and for thereafter again tilting a plurality of bottles and conveying them in their proper positions to the cells provided within the crates.

The invention further comprehends means for successively moving the crate to exposed unfilled transverse rows of cells therein for the reception of bottles which have gone through the sequence of operation including the inversion thereof to perform the inspection and mixing functions and the righting of the bottles before they are discharged into the cells.

Another objection of the invention is to provide means for attaching the driving mechanisms for my invention to the conveyor mechanism of the conventional bottling machinery in such a way so that the operating parts of the attachment are timed with respect to the speed at which the conveyor is moved.

The invention comprehends a multiplicity of other and more detailed objects which will be apparent to those skilled in the art from a reading of the following specification in conjunction with the drawings attached hereto and forming a part hereof, in which:

Fig. 1 represents a top plan view of the machine parts being broken away,

Fig. 2 is a central longitudinal section of the machine,

Fig. 3 is a view similar to Fig. 2 but showing the tray in its forward position and, Fig. 4 is a view in side elevation the dotted lines showing the different positions of the pusher, and the means for automatically moving the crate forwardly.

Referring now more specifically to the invention, A designates a conveyor belt provided by the conventional bottling machinery for transferring a number of bottles from the capping operation. B is a trough, forming a part of my attachment over which the conveyor travels, which trough is preferably provided with upstanding flanges C and D to maintain the bottles in an upright position. I preferably provide a stop E to cause the bottles F to closely abut one another prior to the upsetting operation to be hereinafter described. There is also preferably provided a shield F' for the purpose of preventing the pusher from accidentally upsetting more than the desired number of bottles. G is a pusher for simultaneously delivering a plurality of bottles from the conveyor A to the tray H, normally lying in an inclined position as shown in Fig. 2, which tray is provided with a multiplicity of compartments I corresponding in number to the transverse cells within the bottle crates being filled.

The pusher G is swung into the position shown in dotted lines G (Fig. 4) by the rotation of the shaft K, which shaft is journaled within the side walls of the casing L. This shaft K is rotated, in order to swing the pusher, to upset the bottles into the tray aforesaid by an actuating shaft M (Fig. 1) longitudinally extending with respect to the casing and provided with a plurality of lifting fingers N and R, the lifting finger N engaging a lateral projection P rigidly secured to the pusher shaft K and moving the pusher to its dotted line positions when engaging and upsetting the bottles F. This lifting operation of the pusher is resisted by a rather strong spring O so that the pusher immediately returns to its inoperative position as shown in full lines in Fig. 4. The shaft M is driven by a plurality of chains Q and U (Fig. 1), which chains are operatively connected with the conveyor belt of the bottling machine and so timed that the pusher bar and other devices to be hereinafter explained will be operated in timed relation to the speed of the conveyor belt so that the proper number of bottles (for instance, 4) will always be in position to be engaged and upset by the pusher bar at the correct time.

After the pusher has delivered bottles to the tray in the position shown in Fig. 2, a further rotation of the actuating shaft M will bring a second lifting finger R into contact with a lateral projection S provided by the tray shaft T and rigidly secured thereto, which shaft is also journaled within the casing L. The rotation of the shaft M and the contact between the finger R and the lateral projection S will cause the tray to be swung around into the different positions shown in Fig. 3 and designated by reference letters H in order that the contents of the bottles will be thoroughly stirred and a sufficient time will be allowed for an attendant to carefully inspect the condition of the bottles to determine if any extraneous material is contained therein or if the bottles are cracked or otherwise injured. The tray is provided with a trip W, which causes the bottles to be again tilted and delivered into the confines of a plurality of transversely arranged chutes X where they are righted and delivered in a vertical position to the cells within the crate Y.

The tray is provided with a spring Z which causes the tray to automatically return to its inclined position shown in Fig. 2 after the lifting pin R and the projection S on the tray shaft T have become disengaged.

I provide means for automatically forwarding the crate to exposed different transverse rows of cells therein for the reception of bottles during each operation. This is accomplished in the following manner:

When the pusher G is moved to its dotted line position against the tension of the relatively large spring O, the element 1 is caused to engage the element 2, rigidly secured to the pusher shaft in the manner shown in Fig. 4. Just as soon as the finger N of the actuating shaft M disengages the lateral projection P secured to the pusher shaft, the spring O asserts itself and forces the member 1 and the pivot bar 3 to the dotted line position shown in Fig. 4 against the tension of the relatively weaker spring 5 attached to the depending element 6. The spring 5, therefore, normally causes the member 3 to remain in its full line position shown in Fig. 4. When the powerful spring moves the pivot lever 3 to its dotted line position, the inturned portions 8, sliding within the slot 9 formed in the casing L, move the box propelling fingers 10 forwardly, thus moving the box or crate to a predetermined position to expose different transverse rows of cells to the delivery chutes F aforesaid. By this time, the member 2 has disengaged itself from the member 1 and the spring 5 causes the pivot lever 3 and the box propelling fingers to move backwardly into their operative position. Now, a further rotation of the actuating shaft M will, by this time, engage the lateral projection S for the purpose of swinging the tray H to perform the mixing inspecting, and righting operations aforesaid, so that the bottles are conveyed by the chutes X into the exposed row of cells within the crate. This sequence of operation continues until the entire crate has been filled and thereafter another crate is introduced, preferably in an automatic manner.

Briefly, the operation of the device is as follows:

Bottles are propelled by the conveyor mechanism A to the position shown in Figure 1, when the pusher engages the bottles, causing them to drop over into the inclined tray H, and a little later the tray is caused to be swung around to the positions shown in Fig. 3 in order to afford ample time and views for inspections, and causing the contents of the bottle to be mixed, after which the bottles are placed in their upstanding positions by means of the chutes X and delivered into the crates Y. It will also be apparent that upon the backward movement of the pusher G, caused by the powerful spring O, that the lever 2 will move through the dotted line position shown in Fig. 4, to its normal position shown in full lines, which movement of the lever 2 will automatically rock the arm 3 against the tension of the spring 5 to thereby move the box or crate forwardly, after which the rocking lever 3 returns to its normal position; the tray is then swung around in order to deliver the bottles in their upstanding positions to the exposed rows of cells within the crate.

The lever 2 has a laterally extending finger portion 2ª normally in alignment with the end of the pivoted member 1 as shown in the intermediate dotted line position of the element 2 in Figure 4 of the drawing. Now as the lever 2 is advanced inwardly towards its full line position, by swinging through an arc, this finger 2ª engages the member 1 and rocks it against the tension of the spring 5 to an extreme inward position to thereby urge the element 10 to forward the crate after the swinging member 2 with its engaging finger 2ª has pushed the member 1 forwardly a determined degree disengagement of the finger 2ª from the end of the member 1 is effected merely by the finger 2ª riding upwardly over the member 1. In other words, the finger 2ª simply slips off the end of the member 1 after the determined swinging movement of the pivoted lever 2. In order to guide the rod 1, I provide a slotted member 2ᶜ, as shown in Figure 4 of the drawings. This prevents the member 1 from rising upwardly, but permits it to be swung downwardly against the tension of the small spring when the swinging member 2 is on its back stroke, the edge of the swinging member 2 engaging the rod and urging it downwardly so as to permit the member 1 to again occupy its dotted line position and in condition for another cycle of operation. In other words the swinging element 3 occupies, in its extreme position, an abutting relationship with respect to the portion 9 of the slot formed in the side of the apparatus. In this position the lever 2 has ridden over and become disengaged from the end of the member 1 and the spring 5 is then at liberty to exert a swinging movement to the member 3 and its associated part 1 to the full line position. The subsequent inwardly swinging movement of the member 2 against the powerful swinging of the member O causes the finger 2ª aforesaid to slightly tilt the element 1 against the tension of the small spring 2ᵇ in order that it may again occupy the intermediate dotted line position shown in Figure 4 for engaging and pushing the member 1 and its associated member 3 forwardly on the next cycle of operation.

It will be obvious to those skilled in the art that many variations in the construction and arrangements of the parts may be made without departing from the spirit of the invention, such as substitution of cams for levers, devices other than coil springs for returning the parts to their operating positions, etc., and I do not desire myself to be specifically limited to these details of construction in the following claims.

Having thus described my invention, what I claim is:

1. In combination, a conveyor belt for bottling machinery, means operating in timed relationship to the speed of said belt for upsetting a plurality of bottles from said belt to mix the contents of the bottles and inspect the same, means for further moving the bottles into their upstanding positions and crating the same, and means for automatically moving the crate to expose different cells therein.

2. In combination, a conveyor for bottling machinery, a pivotal tray positioned within proximity to said conveyor, a pusher for delivering bottles from the conveyor to said tray to invert the same to mix the contents thereof and permit inspection of the condition of the bottles, and means for thereafter causing the bottles to regain their upstanding positions and crate the same.

3. In an apparatus of the kind described, the combination with means for forwarding bottles, of means for upsetting the said bottles to invert the same, and means for righting the bottles in their upstanding positions and deliverng them to crates and means for moving the crate forward step by step in synchronism with the bottle righting and delivering means.

4. In an apparatus of the kind described, the combination with means for forwarding bottles of means for upsetting the said bottles to invert the same, means for righting the bottles in their upstanding positions and delivering them to crates, and means for propelling the crate to expose different rows of cells therein.

5. A crating, inspection, and mixing apparatus adapted for attachment to bottling machinery comprising a conveyor for the filled bottles, a tray having a plurality of compartments therein corresponding to the number of transverse cells in the crate to be filled, means for delivering a like number of bottles, simultaneously, from the conveyor to the tray, means for swinging the tray to a position where the bottles are placed in a vertical inverted position, co-ordinate means for simultaneously delivering the bottles in their upstanding righted position to the transverse cells of the crate, and means for automatically moving the crate to expose different cells therein.

6. A crating, inspection, and mixing apparatus adapted for attachment to bottling machinery of the type comprising a movable conveyor for advancing filled bottles, a pivotal swinging tray positioned in close proximity to the conveyor, at right angles thereto, said tray having a plurality of compartments therein, means for automatically swinging the pivotal tray to a position wherein the bottles are placed in their inverted positions, and receiving chutes associated with the tray for receiving the bottles and discharging them into containers in their upstanding position.

7. A crating, inspection, and mixing apparatus adapted for attachment to bottling machinery, comprising a conveyor, for forwarding the filled bottles, a receiving tray located in proximity to the conveyor, a pusher for discharging the bottles from the conveyor onto the receiver, operating instrumentalities adapted to first actuate the pusher and then swing the tray to a position wherein the bottles are caused to be discharged into chutes for deliverance to the transverse cells of a crate in their upstanding positions.

8. A crating, inspecting, and mixing apparatus adapted for attachment to bottling machinery, comprising a conveyor for forwarding filled bottles, a pivotally mounted tray mounted in proximity to the conveyor, a pusher for simultaneously discharging a plurality of bottles onto said pivotal tray, mechanism for first actuating the pusher and thereafter for swinging the tray, a chute having a number of passages therein corresponding to the bottles in said tray, said chute being constructed and arranged to receive the bottles and discharge them to the crate cells in their upright positions.

9. A crating, inspection, and mixing apparatus adapted for attachment to bottling machinery, comprising a movable tray having a multiplicity of compartments therein corresponding to the number of transverse cells in the crate to be filled, a conveyor mechanism, means for discharging bottles from the conveyor mechanism to the tray, means for swinging said tray to a position wherein the bottles are placed in their inverted positions for inspection and mixing purposes, and for delivering the bottles to the crate cells in their vertical positions, and means for automatically advancing the crate to expose unfilled transverse cells therein, said means being operated at a time prior to the pivotal actuation of the tray.

10. A crating, inspection, and mixing apparatus of the character described, comprising a conveyor for forwarding filled bottles, a receiving tray, a pusher bar for discharging bottles to said tray, actuating instrumentalities operating in timed relationship to the speed of the said conveyor adapted to first operate the pusher for discharging bottles from the conveyor into the tray and for thereafter moving the tray to a position for discharging the bottles into crates in their righted conditions, and automatic means associated with the pusher for successively moving the crate to expose different unfilled cells therein during each sequence of operation.

11. A crating, inspection, and mixing apparatus of the character described, comprising a conveyor, a pivotally mounted pusher mounted in proximity to said conveyor, a pivotal tray normally resting in inclined position with one side thereof closely approaching the conveyor, an actuating shaft operatively connected to the driving mechanism of the conveyor, said actuating shaft having devices for first swinging the pusher to engage and discharge the bottles and thereafter swinging the tray in a position wherein the bottles are placed in their inverted position, means for righting the positions of the bottles and discharging them into the transverse cells of a crate.

12. A crating, inspection, and mixing apparatus of the character described, comprising a conveyor, a pivotally mounted pusher mounted in proximity to said conveyor, a pivotal tray normally resting in inclined position with one side thereof closely approaching the conveyor, an actuating shaft operatively connected to the driving mechanism of the conveyor, said actuating shaft having devices for first swinging the pusher to engage and discharge the bottles, and thereafter swinging the tray in a position wherein the bottles are placed in their inverted position, means for righting the positions of the bottles and discharging them into the transverse cells of a crate, and means for automatically forwarding the crate directly after the pusher has been actuated.

13. A crating, inspection, and mixing apparatus of the character described, comprising a conveyor, a pivotally mounted pusher mounted in proximity to said conveyor, a pivotal tray normally resting in inclined position with one side thereof closely approaching the conveyor, an actuating shaft operatively connected to the driving mechanism of the conveyor, said actuating shaft having devices for first swinging the pusher to engage and discharge the bottles and thereafter swinging the tray in a position wherein the bottles are placed in their inverted position, means for righting the positions of the bottles and discharging them into the transverse cells of a crate, and means operated upon the backward movement of the pusher for automatically advancing the tray.

In testimony whereof I affix my signature.

ANTHONY W. BROWN.